United States Patent [19]
Bell et al.

[11] 3,760,944
[45] Sept. 25, 1973

[54] SUCTION OIL DECANTER

[75] Inventors: Edwin A. Bell, Lake Charles; Thaddeus F. Padden, Sulphur, both of La.

[73] Assignee: Cities Service Oil Company, Tulsa, Okla.

[22] Filed: Mar. 12, 1971

[21] Appl. No.: 123,513

[52] U.S. Cl. ............... 210/110, 210/188, 210/242, 210/DIG. 21
[51] Int. Cl. ............................................. E02b 15/04
[58] Field of Search .................... 210/109, 188, 242, 210/250, 84, 110, DIG. 21

[56] References Cited
UNITED STATES PATENTS

| | | | |
|---|---|---|---|
| 3,223,243 | 12/1965 | Muller | 210/242 |
| 3,532,219 | 10/1970 | Valdespino | 210/242 |
| 3,556,301 | 1/1971 | Smith | 210/242 |
| 3,412,862 | 11/1968 | Chanlin | 210/84 X |
| 3,568,836 | 3/1971 | Ray | 210/250 X |
| 1,883,594 | 10/1932 | Cross | 210/188 X |

*Primary Examiner*—John Adee
*Attorney*—J. Richard Geaman

[57] ABSTRACT

Disclosed herein is apparatus for the continuous removal of an oil slick from a body of water. The apparatus consists of a housing connected to an air suction device which draws a large volume of air through the housing. The movement of air through the housing causes the oil slick to be pulled within the housing and accumulated therein. This accumulation activates apparatus within the housing which withdraws the accumulated oil from within the housing and removes it to a storage reservoir for further usage.

1 Claim, 4 Drawing Figures

INVENTORS
EDWIN A. BELL
THADDEUS F. PADDEN
By *J. Richard Granum*
ATTORNEY

INVENTORS
EDWIN A. BELL
THADDEUS F. PADDEN
By J Richard Geanna
ATTORNEY

SUCTION OIL DECANTER

BACKGROUND OF THE INVENTION

This invention relates to the removal of oil slick contamination from a body of water. More particularly, the invention is an apparatus for the decanting of an oil slick from a body of water formed from the production or refining of oil.

In the art of oil production and refinery engineering a tremendous emphasis has been placed upon the requirement that the ecology of the areas of oil production and refining of the oil into various hydrocarbon products must not be changed so as to destroy the environment which preceded the oil operations. One of the major problems which has been developed within the oil industry is the contamination of bodies of water by oil slicks. An oil slick is an incremental amount of liquid hydrocarbon, having a density less than that of the water into which it is introduced, which accumulates on the surface of the water, coagulates and may form emulsions which are not readily biologically degradeable by the bacteria contained within the body of the water.

Many methods and arrangements of apparatus have been utilized in order to remove oil slicks or degrade oil slicks into a form by which they may be consumed and thereby removed from the water. Oil slick removal methods include biological degradation of the oil through use of waste water treatment plants in which gravel beds containing bacteria are utilized so as to consume the hydrocarbons contained in the water, activated charcoal settling beds which physically remove the oil from the water by absorption and mechanical apparatus such as oil skimmers.

In general, an oil skimmer of a mechanical variety consists of a pump located on a floating platform. The suction portion of the pump is adjusted so that it is positioned a fraction of an inch below the surface of the body of water contaminated by the oil. The oil skimmer is also positioned so as to be exposed to the greatest amount of oil accumulation formed by the wind, wave motion or other physical phemomena. The pump inlet is adjusted such that a majority of the oil is removed from the water with a minimum removal of water therewith. An inherent problem with conventional oil skimmers is that a definite quantity of water is removed with the oil slick, necessitating the use of an elaborate decanting or distillation scheme to separate the oil and water so that uncontaminated water may be returned to the water source.

What is required is a simple mechanical apparatus for removing an oil slick from a body of water. The apparatus should preferably be capable of automatically removing an oil slick from a body of water so that little physical separation is required to place the oil in a reuseable form and return the separated water to the body of water.

It is an object of the present invention to provide an apparatus for the separation of oil slicks from a body of the water.

It is a further object of the present invention to provide a mechanical apparatus which may be left unattended and will separate oil slicks from a body of water.

It is still another object of the present invention to provide an apparatus which may be constructed stationary or made to float so that removal of an oil slick from a body of water may be facilitated by placing the separation apparatus in the stationary position or by allowing the apparatus to float and follow the oil slick buildup.

SUMMARY OF THE INVENTION

The objects of the present invention are accomplished by an apparatus for the removal of an oil slick from a body of water. The apparatus comprises a covered housing adapted to be positioned on a body of water and having an opening in at least one side thereof. Within the housing are means for drawing air along the surface of the water through the housing and means for withdrawing accumulated oil from the housing. The means for drawing air through the housing may comprise an air blower connected to an air conduit, the other end of which is connected to the top of the housing. A gate may be pivotally attached to the top of the opening in the side of the housing so as to regulate the flow of air therethrough.

BRIEF DESCRIPTION OF THE DRAWINGS

The present invention is hereinafter described in further detail with particular reference to the following drawings in which.

DETAILED DESCRIPTION OF THE INVENTION

Figure 1:
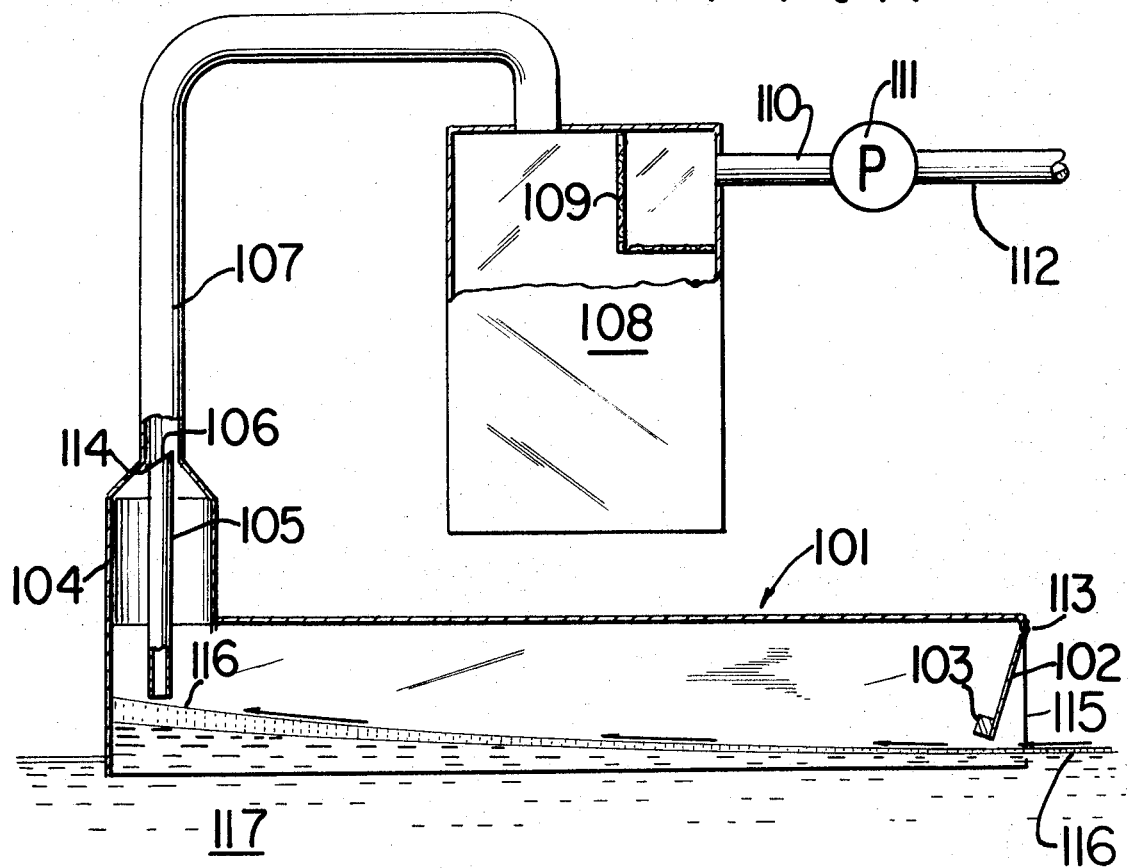
FIG. 1 depicts a cross-sectional side view of one embodiment of the suction oil decanter of the present invention.

In the application of the present invention, the suction oil decanter apparatus is positioned on the body of water which contains an accumulation of oil or an oil slick thereon. The present apparatus may be stationary or movably positioned on the body of water so as to track the oil slick or draw the oil slick within its housing. By the phenomena of the rapid movement of a massive body of air across a body of water, it has been shown, due to variation in the surface tension between oil and water and air and oil, that the oil slick will be drawn towards the point of removal of the air vertically from the body of water. Thereby, by placing an air blower, or some other means for drawing air across the body of water, in conjunction with a housing or scoop, to form a vacuum-cleaner type assembly, it is found that oil may be drawn within the housing and accumulated in a portion thereof to subsequently be withdrawn and placed in a storage vessel. By use of such an apparatus it is possible to obtain an exact decanting of oil from the body of water with little, if any, removal of water therefrom. Since the specific gravity of the accumulated oil and the body of water are quite varied, and the vapor pressure of the oil is generally less than that of the body of water, the oil is preferentially lifted from the surface of the body of water. These physical characteristics of the oil-water system allow a more exacting decanting of the oil from the water and higher oil to water ratio to be obtained than conventional decanting techniques.

In a preferred embodiment, the apparatus of the invention includes a covered housing adapted to be positioned in or on the body of water from which oil is to be removed. The sides of the housing extend into the water and at least one side has an opening positioned so that when the housing is positioned for operation, the surface of the water extends through the opening. While any suitable configuration of housing may be used, it is generally desirable that the housing be shaped so that the opening through which oil may be drawn along the surface of the water is relatively large in a horizontal direction as compared with the area from which accumulated oil is removed from the housing. Preferred configurations in plan view include triangular and circular. With the triangular configuration, the air conduit through the housing is preferably attached at the apex of the triangle with the opening at the opposite side so as to form a scoop effect with a higher velocity of air across the surface of the water near the apex of the triangle. This will result in a greater depth of accumulation of oil in the vicinity of air conduit. In the circular configuration the air conduit is preferably connected at the center of the top of the circular housing with one or more side openings being spaced around the circumference.

The means for withdrawing accumulated oil from the housing may comprise an oil conduit, one end of which is vertically positioned within the housing so as to be perpendicular with the body of water contained therein, associated with means for automatically conveying oil through said oil conduit when oil is accumulated within the housing. Means for automatically conveying oil through said oil conduit may comprise an electrically activated pump with its inlet connected to the exit of the oil conduit and means for activating the pump when oil is accumualted within the housing, for example a float switch. Other suitable means for withdrawing accumulated oil from the housing may comprise positioning the oil conduit within the air conduit with means for controlling the flow of air through the conduit such as an automatically activated valve, for example a flap valve, positioned within the oil conduit. In most applications the means for withdrawing accumulated oil from the housing will be associated with an oil storage reservoir so that oil may be accumulated without the body of water or returned for further use.

Figure 2:
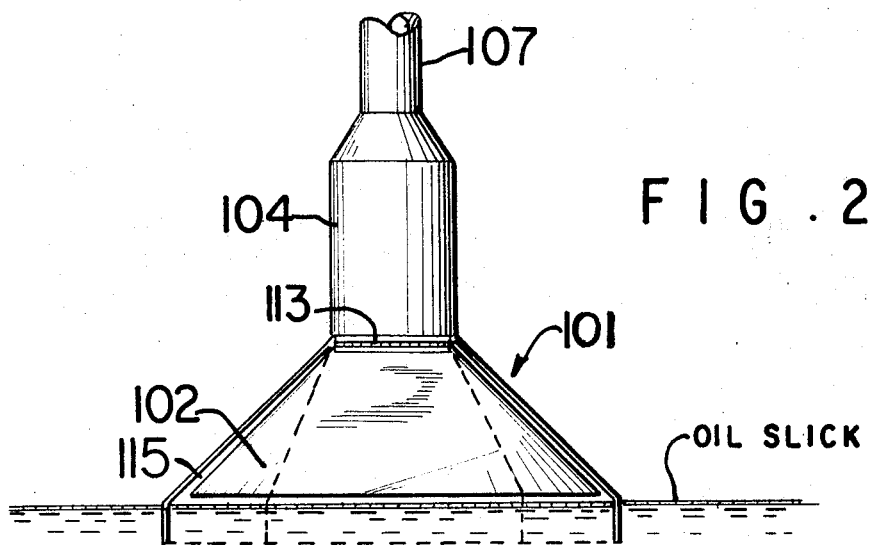
FIG. 2 depicts an end view of decanter of FIG. 1.
Figure 4:
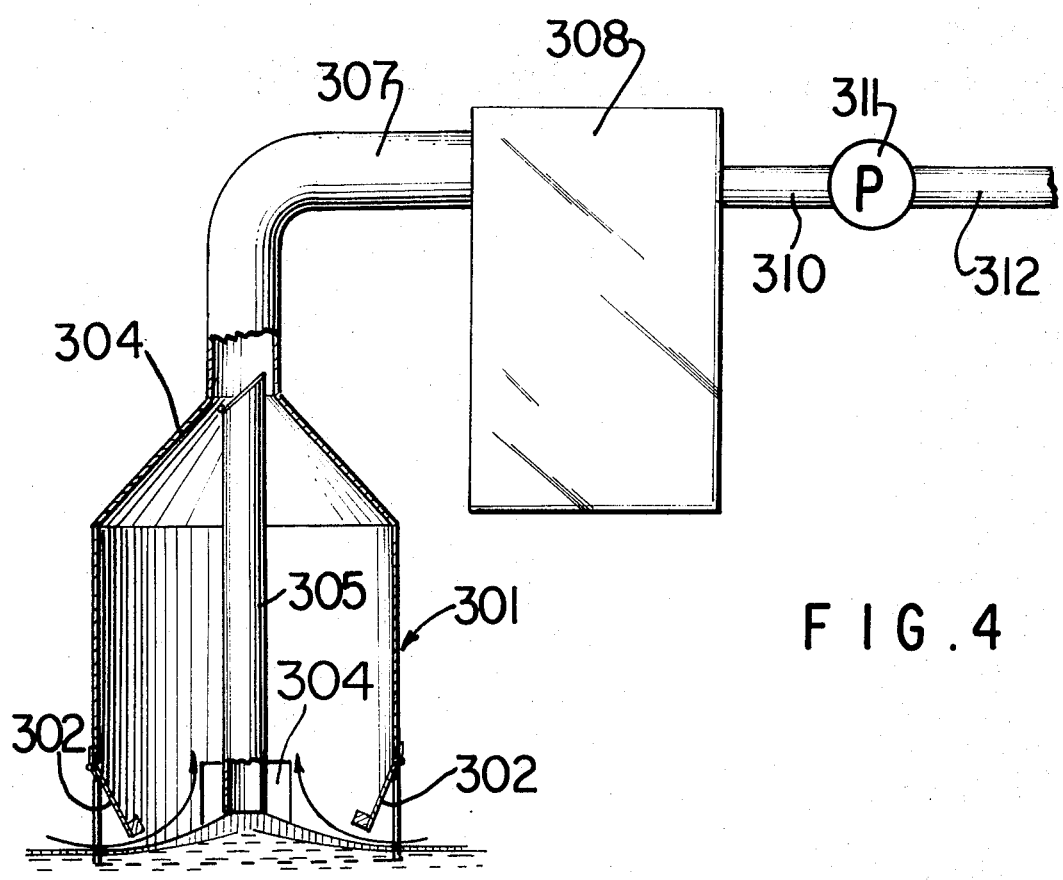
FIG. 4 depicts a cross-sectional side view of the apparatus of FIG. 3.

The particular ramifications of the present invention may be more easily understood by referring to FIGS. 1 and 2 in which a housing 101 is positioned so as to have a top portion and sides with at least one opening in the sides. It is neither necessary nor especially desirable for the housing 101 to have a bottom. Air conduit 104 is connected to the top of the housing and in turn connected by restricted air conduit 107 to a storage reservoir 108. Positioned within air conduit 104 is an oil conduit 105 having a flap valve 106 pivotally attached thereto by pivot pin 114. The oil conduit is positioned perpendicular to the body of water so that the mouth thereof is a short distance above the surface of the oil accumulated within the housing. Also connected with the oil reservoir 108 is air blower inlet 110 to air blower 111 having a blower exit 112. A gate 102 is pivotally attached to the housing 101 at the top of an opening in the side thereof by hinge 113. Gate 102 is provided with weighting means 103 such that it may regulate the opening of the gate and thereby control the amount of air pulled across the body of water within the housing. This control is maintained automatically as the gate will open proportionally according to the amount of air drawn by blower 111.

In operation of the present invention, the activation of the air blower 111 will cause a rapid movement of air to be drawn across the surface of the body of water and into housing 101. When a gate 102 is provided such as shown in FIG. 1, and balanced by weighting means 103, a rapid flow of air caused by blower 111 will draw gate 102 inward and allow an incremental flow of air across the body of water contained within housing 101. This flow of air will cause the oil slick contained upon the body of water to move or be sucked toward the rear portion of housing 101. As this oil accumulation builds up, the incremental distance between the top of the oil build up 116 on the surface of the body of water 117 and the bottom of oil conduit 105 will become smaller. As the incremental distance lessens, the suction force upon flap 106 will build until the flap is lifted thereby allowing air to be drawn through oil conduit 105. This movement of air causes the oil 116 to be removed from the body of water 117. The entrained oil is conveyed through oil conduit 105, restricted air conduit 107 and into oil reservoir 108. Any foreign entrained oil particles, however, may be removed by passing the air-oil mixture through entrainment removal means which may consist of a wire mesh arrangement 109 placed across pump inlet 110.

As can be seen from FIG. 2 the housing 101 is triangular in shape with the mouth forming the base of the triangle and having gate 102 attached thereto. As air is drawn within the mouth of the housing and the gate is lifted, a restricted air flow and therefore an increased velocity of the air is caused towards the rear portion or apex of the triangular housing 101. It can be seen that the air velocity is quite low at the mouth of the housing and is kept at a constant rate by gate 102. However, the air velocity within the housing becomes ever increasing towards the rear portion of the housing such that the oil is accumulated about the air conduit 104 and oil conduit 105.

As an example of the usage of the oil decanter depicted in FIGS. 1 and 2 it is assumed that a blower having a capacity of 15,000 cubic feet per minute with a 12 inch suction would cause an air velocity of 210 miles per hour through the suction tube. If the opening in the side of the housing is 30 feet wide, the air will move over the water through the opening at 5.7 miles per hour, assuming a 4 inch clearance between the water and the baffle. If the housing narrows to 5 feet wide with an 8 inch clearance above the water, the air will flow 17.1 miles per hour in this portion of the housing, thereby accumulating the oil and stacking it in the rear portion of the housing to a depth of about 6 inches for removal through conduit 105. While the velocity of air movement through the opening of the housing is not critical, it is in general preferred that velocities exceed about 2 feet per second. Likewise, while velocity of air across the surface of the water at the point where it is desired to remove accumulated oil from the housing is not critical, it is preferred that such velocities exceed about 10 feet per second, more usually at least about 15 feet per second, to insure that oil will accumulate to a sufficient depth to allow removal without removing significant quantities of water along with the oil. It is preferred that the intake end of the oil conduit 105 be positioned between about 2 and about 8 inches above the surface of the water to allow removal of accumulated oil without removal of water.

Figure 3:
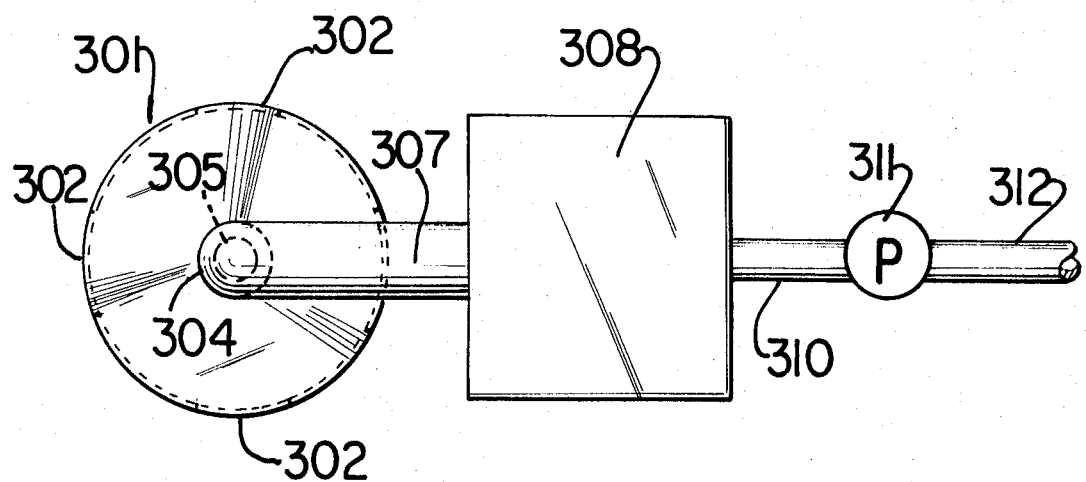
FIG. 3 depicts a plan view of a circular suction oil decanter of the present invention.

A further embodiment of the present invention is depicted in FIG. 3 whereby a circular housing 301 having one or more gates 302 positioned thereabout is connected to air conduit 304 and oil conduit 305 in the center portion of the housing whereby oil is drawn within the housing through gates 302 and accumulated about the oil conduit 305 and the air and oil lifted from the water's surface through line 307 to storage vessel 308. Air continues through pump inlet 310, pump 311 and is exited from pump exit 312. The operation of the circular housing has the advantage that it may be placed in the central portion of an oil skimming pond and thereby draw oil from the entire peripheral area surrounding the apparatus so that continuous decanting of oil from water's surface may be enhanced.

In the construction of the housing and other materials of the present invention, any construction material which will resist the corrosiveness of water and withstand endured usage may be utilized. Typical materials of construction include wood, aluminum, stainless steel and other materials which have sufficient rigidity and may be easily fabricated. The housing may have one or more support legs attached to it in order that it may remain stationary upon the body of water or the housing may be constructed of a buoyant material so as to float and be movable for various positionings on the body of water to track the oil slick movement and thereby facilitate its removal. The gate may be made of the same or different material than the housing and is preferably of such a weight that it will restrict flow of air through the opening or openings in the housing to achieve the desirable air velocities mentioned above. It is apparent that the weight of the gate will determine the velocity of air across the surface of the water through the opening into the housing and it is preferred that provision be made for varying the weight of the gate to allow somewhat differing of velocities. While the clearance between the bottom of the gate and the surface of the water during operation of the apparatus is not critical, it is generally preferred that the apparatus be constructed and operated so that desirable air velocities are achieved with gate clearances from about one-half to about 5 inches. An adjustable opening as provided by the pivoted gates described above is considered advantageous over a fixed opening in that it allows for wave action, uneven water heights, etc. and is less likely to result in blockage of the opening by the water. It should be understood that where conditions permit, fixed gates, preferably capable of being positioned at different heights, may be employed or the opening may merely be constructed of the desired height.

It can be seen that the suction oil decanter described herein automatically allows the removal of accumulated oil or oil slicks from a contaminated body of water through continuous unattended operation. The present invention also allows the exact decanting of an oil slick from a body of water so that the oil may be removed without removal of substantial amounts of water. It should be understood that various embodiments of the invention exist outside those disclosed and it will be appreciated by those familiar with the art that various modifications and changes may be made without departing from the scope of the invention as set forth.

Therefore, we claim:

1. Apparatus for removing an oil slick from a body of water comprising:

a. a housing (101) having a top and sides with at least one opening (115) in the sides, the housing being positionable over a body of water (117) having an oil slick (116) on the surface thereof with the sides of said housing projecting into said body of water while the opening (115) extends both above and below the oil slick (116), b. a gate (102) pivotally attached to housing (101) at the top of the opening (115) with a hinge (113), and weighting means (103) attached to the bottom of the gate (102), c. an air conveying conduit (104) connected to the top of the housing (101) and which intercommunicates with the interior of said housing and further including a restricted air conveying conduit (107) which intercommunicates with the air conveying conduit (104) at one end and with an oil storage reservoir (108) at the other end, d. an oil conveying conduit (105) positioned within the air conveying conduit (104), the lower end of the oil conveying conduit extending into the interior of the housing (101) and the upper end thereof extending into the restricted air conduit (107), said oil conduit having a flap valve (106) pivotally attached thereto at the upper end with a pivot pin (114), e. an air blower (111) having a blower exit (112) and a blower inlet conduit (110) which intercommunicates with said reservoir (108), and f. means (109) for removing entrained oil from air which enters the blower inlet conduit (110).

* * * * *